Patented June 9, 1953

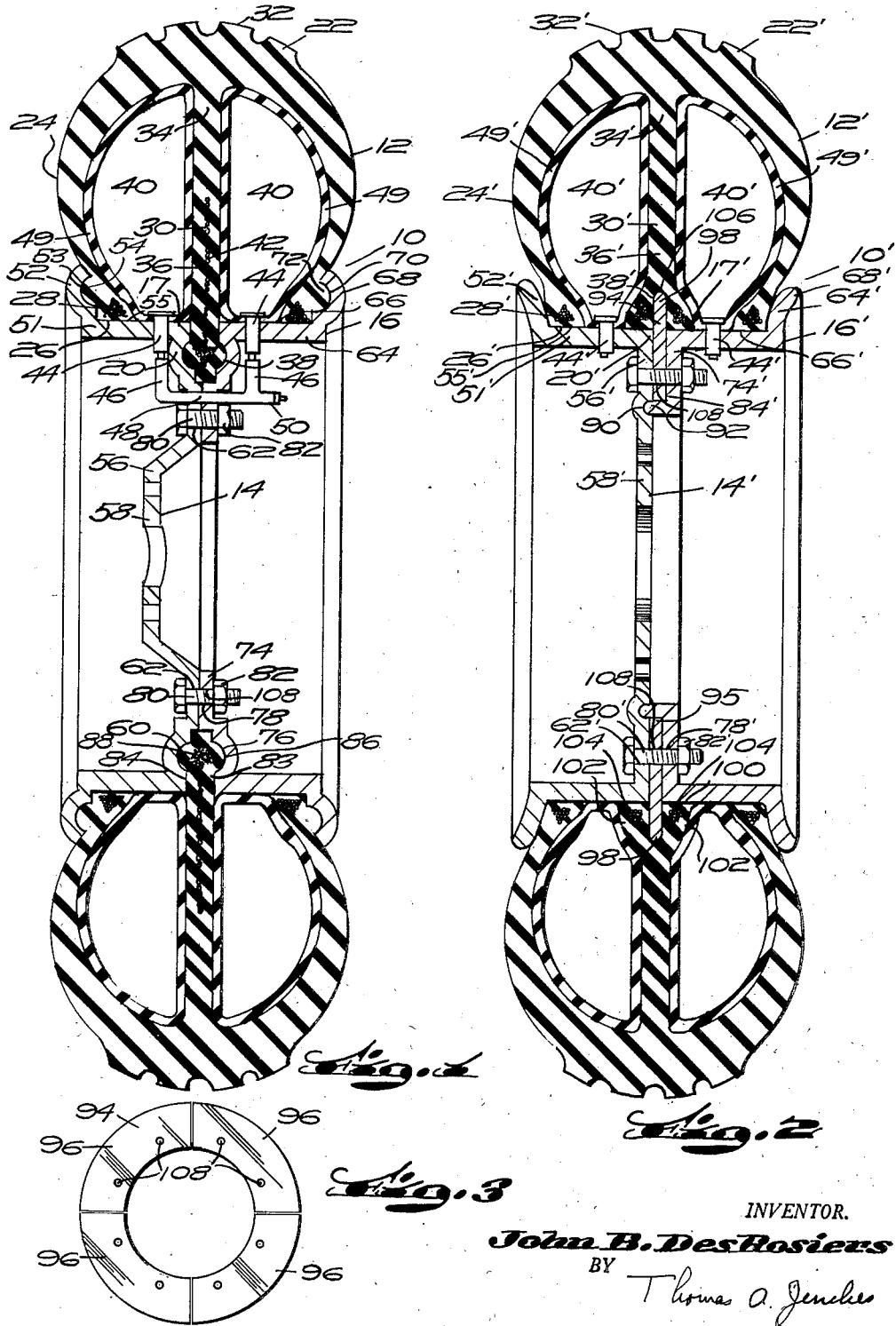

2,641,295

UNITED STATES PATENT OFFICE 2,641,295

MULTICHAMBER PNEUMATIC TIRE

John B. Des Rosiers, Providence, R. I.

Application April 21, 1949, Serial No. 88,705

4 Claims. (Cl. 152—339)

My invention relates to improvements in multichamber pneumatic tires and the combination of such a tire with a wheel, having the rim and other tire attaching parts thereof modified to firmly attach the tire thereto.

I am aware that others have provided many types of multichamber tires, but have always provided flexible partition walls between the annular multichambers thereof. The great difficulty with these has been that when one chamber collapses, nature attempts to fill the vacuum with the nearest air present, which is the air in the opposite unpunctured or uncollapsed chamber, which tends to expand to fill the vacuum, and in accordance with Boyle's law, where two chambers are employed, doubles the volume of one hemi-cylindrical chamber to a completely cylindrical chamber correspondingly reducing the pressure. Thus, if a two chamber tire is provided and both chambers be inflated to a pressure of 32 pounds, when the second chamber collapses, the expansion of air in the first chamber will bend over the flexible wall to cause the air in the first chamber to fill up the whole tire, thereby doubling its volume so that its pressure will be reduced substantially to half that amount, namely, 16 pounds, an amount insufficient to support the vehicle on the tire in use, providing a pressure very close to atmospheric.

My invention contemplates the provision of a central partition wall which is rigid throughout at least the lower portion thereof to greatly lessen the tendency of the air in the non-collapsed chamber to expand and increase its volume appreciably, thereby lowering its pressure to a dangerous amount. In other words, I provide a tire in which even if one chamber be collapsed, the other chamber will have enough air in it at sufficient pressure to at all times support the vehicle so as to obviate the danger of blow-outs completely collapsing the tire and possibly wrecking the vehicle and preventing the collapsed tire from coming off the rim, and providing at least a sufficient support in the tire so that the motor vehicle may be driven to the nearest garage for changing the tire.

Objects of my invention, therefore, are to provide a tire in which the danger inherent in blowouts in present day tires is substantially eliminated and a tire in which even if a blow-out should occur, the tire itself will not become damaged or ruined while bringing the vehicle to a stop.

A further feature of my invention resides in the fact that I preferably so extend the center partition wall of the tire below the end walls thereof, or so otherwise modify the lower portion of the center partition wall and adjoining portion of the wheel rim, that the lower end of the center wall will be positively locked in position at all times, even if one of its respective chambers has become collapsed.

A further object of my invention is to eliminate the necessity of jacking up a car on the road in order to change the tire after a blow-out or puncture.

A further object of my invention is to localize the pressure brought on the tire on passing over a stone, irregularity in the road or other abutment, to the area of contact, and not distribute the shock throughout the entire tire, to cause a recirculation of air throughout the entire tire, and to thereby lessen the heat generated, provide cooler riding qualities in the tire and the generation of a lesser amount of heat to cause deterioration of the rubber, my invention thus maintaining a cool tire in use.

These and such other objects of my invention as may hereinafter appear will be best understood from a description of the accompanying drawings which illustrate embodiments thereof.

In the drawings,

Fig. 1 is a vertical sectional view through a tire and vehicle wheel constructed in accordance with one embodiment of my invention.

Fig. 2 is a vertical sectional view through a tire and wheel constructed in accordance with another embodiment of my invention.

Fig. 3 is a side elevation of the locking rim employed in the embodiment of my invention shown in Fig. 2.

In the drawings, wherein like characters of reference generally indicate like parts throughout, 10 and 10' generally indicate embodiments of vehicle wheels constructed in accodance with my invention.

In the embodiments shown, each wheel comprises a standard type of cylindrical tire 12 or 12' modified in accordance with my invention, a disc wheel 14 or 14', having the rim 16 or 16' suitably modified in the manner to be explained. For this purpose, the rim is provided with suitable annular locking means 20 or 20' for the lower end of the tire center wall.

My improved tire 12 comprises an annular cylindrical casing or shoe 22 or 22' having arcuate side walls 24 or 24' terminating in flat rim abutting lower ends 26 or 26'. Said lower ends 26 or 26' may have a standard type of strengthening metal wire bead 28 or 28' incorporated therein. In accordance with my invention, I provide an annular center wall 30 or 30' projecting downwardly centrally of the tread surface 32 or 32' thereof, to the rim, as in the embodiment shown in Fig. 2, or to below the rim as in the embodiment shown in Fig. 1. I construct my improved center wall with a flexible upper portion 34 or 34' and a rigid lower portion 36 or 36', and the lower end thereof is preferably provided with suitable locking means 38 or 38' adapted to be engaged with the annular locking means 20 or 20' in said rim 16 or 16', to maintain said lower end 36 or 36' in rigid position centrally of said rim 16 or 16' in use, providing complementary hemi-cylindrical annular cushioning air chambers 40 or 40' on each side of said center wall 30 or 30'. The lower portion 36 or 36' of said center wall may be made rigid in any suitable manner. It may be made of rigid hard rubber, as in the embodiment shown in Fig. 2, or reinforced with metal such as by the metal bead 42 extending upwardly therein as in the embodiment shown in Fig. 1. I have shown one type of locking means 38 for the lower end 36 of said center wall 30 in the embodiment shown in Fig. 1, and one of a substantially different type in the embodiment shown in Figs. 2 and 3, which will now be described in detail for each embodiment, with the modifications of the rim necessary therefor. In all embodiments, the individual hemi-cylindrical tire chamber portions 40 or 40' on each side of said center wall are provided with the valves 44 or 44'. In the embodiment shown in Fig. 1, they have the valve ducts 46 discharging therefrom into the common duct 48 leading to the common master valve 50, whereas in the embodiment shown in Fig. 2, separate valves 44' are provided for each individual chamber 40'. Said valves 44 or 44' in the embodiments shown are attached to the tubes 49 or 49' for each individual chamber 40 or 40'.

In the embodiment shown in Fig. 1, the vehicle wheel comprises the centrally split annular tire rim 16, having the flat portion 17 on the upper end thereof for abutment of the flat lower end of the tire against. Said split rim 16 has the usual inner portion 51 having the inner tire wall abutting annular lip or flange 52 which may have an annular groove 53 on the inner surface thereof for receiving the clincher bead 54 on the clincher tire shown in the embodiment shown in Fig. 1, projecting upwardly from the inner end of said rim 16, the flat tire receiving portion 55 and the downwardly projecting web disc 56 projecting downwardly from the outer end thereof, having a center portion 58 adapted to be mounted on the axle either through the brake drum or axle hub, as desired. Said web disc 56 has an annular groove 60 on the outer edge thereof immediately below said upper end and transversely spaced bolt holes 62 below said groove. The rim outer portion 64 also has the flat portion 66 on the upper end thereof for abutment of the flat lower end 26 of the outer tire wall 24 thereagainst, an outer tire wall abutting annular lip 68 projecting upwardly from the outer end thereof, having the groove 70 to receive the annular clincher bead 72 on the outer edge of the tire outer wall 24 and a short annular web 74 projecting downwardly a distance from the inner end of said flat rim portion 66, having a cooperating aligned annular groove 76 on the inner edge thereof immediately below its upper end, and is also provided with the circumferentially spaced bolt holes 78 alignable with said bolt holes 62 in said web disc 56. As means to detachably secure said outer rim portion to said inner rim portion, namely, by securing the webs thereof together, I provide the bolts 80 projecting outwardly through said aligned holes 62 and 78, having the nuts 82 on the outer ends thereof to detachably clamp said web portions together, thus detachably securing said outer rim portion 64 to said inner rim portion 51. In this embodiment, the annular center wall 30 of the tire projects downwardly as at 83 between the spaced flat upper ends 55 and 66 of said inner and outer rim portions 51 and 64 into the space 84 between the spaced flat upper ends of said rim portions and has a cylindrical projection 86, comprising aligned hemi-cylindrical beads on each side of said center wall extension 83 fitting between the grooves 60 and 76 in the webs 56 and 74 of said inner and outer rim portions 51 and 64. In the embodiment shown, said cylindrical portion may also be provided with the strengthening annular bead 88 or the equivalent thereof.

The embodiment shown in Figs. 2 and 3 is generally of the same construction. In this embodiment, the wheel comprises a centrally split annular tire rim 16', having an inner portion 51', having a flat annular portion 55' on the upper end thereof for abutment of the flat lower end 26' of an inner tire side wall 24' thereagainst, an inner tire wall abutting annular lip 52' projecting upwardly from the inner end thereof and a downwardly projecting web disc 56' having a center portion 58' adapted to be rigidly mounted on the axle in the manner aforesaid, having an annular groove 90 at a spaced distance below its upper end, a rim outer portion 64' having the flat annular portion 66' for abutment of the flat lower end 26' of an outer tire side wall 24' thereagainst, an outer tire wall abutting annular lip 68' projecting upwardly from the outer end thereof and a short annular web 74' projecting downwardly a distance from the inner end thereof terminating in an inwardly projecting annular lip 92 adapted to fit in the annular groove 90 in said inner rim web portion 56' and providing an annular space 84' between said webs and split rim portions. In this embodiment, I provide a flat locking ring 94 comprising quarter circular sections 96 for assembly purposes having the lower end 95 abutting said inwardly projecting annular lip 92 and the upper end 98 projecting centrally of said rim between said inner and outer rim portions 51' and 64', and means to clamp said rim portions together with said annular ring 94 having its lower portion 95 interposed in the space 84' between said rim portions 51' and 64'. In this embodiment, the center wall 30' of the tire has the lower rim abutting flat lower end 100, in the preferred embodiment shown projecting outwardly as at 102 at each side thereof, and having an annular supporting bead 104 in each lateral extension 102 thereof and a central annular channel 106 extending upwardly from the lower end thereof, receiving the upper end 98 of said annular ring 94. In this embodiment, the means to clamp the outer rim web portion 74' to the inner rim web disc portion 56' also comprises the bolts 80' extending through suitable aligned circumferentially spaced holes 62' and 78' in said web portions and having the nuts 82' on the outer ends thereof clamping said web portions and ring portion together.

The bolts 80' also pass through suitable holes 108 therefor in the inner portions of said annular locking ring 94 to rigidly clamp the ring in position.

I employ the terms inner and outer in referring to the tire and wheel, with inner signifying the portion adjacent the vehicle and outer signifying the portion away from the vehicle.

I employ the words upper and lower, upwardly and downwardly, etc., relative to the radial position of the parts of the tire, upper signifying at a greater radial distance and lower signifying at a less radial distance in accordance with common automobile parlance, instead of their more cumbersome more accurate terms, and despite the fact that the relative portions change on revolution of the tire, which, however, due to the fact that all parts of the tire are similar, makes no difference.

It is apparent that I have provided a novel type of tire and wheel construction with the advantages described above.

It is understood that my invention is not limited to the specific embodiments shown and that various deviations may be made therefrom without departing from the spirit and scope of the appended claims.

What I claim is:

1. A pneumatic tire for use with rims having annular locking means substantially centrally thereof, comprising an annular cylindrical casing having arcuate side walls terminating in flat rim abutting lower ends and an annular center wall projecting downwardly substantially centrally of the tread surface thereof to the rim, having a flexible upper portion and a rigid lower portion for at least half its lower length and having annular locking means on the lower end thereof adapted to be engaged with the annular locking means in said rim to maintain said lower end in rigid position centrally of said rim providing complementary substantially hemi-cylindrical annular cushioning air chambers on each side thereof.

2. A pneumatic tire, comprising an annular cylindrical hollow casing having arcuate side walls terminating in flat rim abutting ends and an annular central wall projecting downwardly substantially centrally of said tread surface to below said side walls, dividing said hollow interior into two chambers each alone capable of supporting the vehicle, said center wall having a flexible upper portion and a substantially rigid lower portion for at least half its lower length, and having an annular cylindrical portion below said side walls spaced from the lower end thereof.

3. In combination, a tire rim having annular locking means centrally thereof and a pneumatic tire comprising an annular cylindrical casing having arcuate side walls terminating in flat rim abutting lower ends and an annular center wall projecting downwardly substantially centrally of the tread surface thereof to the rim, having a flexible upper portion and a rigid lower portion for at least half its lower length and having annular locking means on the lower end thereof adapted to be engaged with the annular locking means in said rim to maintain said lower end in rigid position contrally of said rim providing complementary substantially hemi-cylindrical annular cushioning air chambers on each side thereof.

4. In combination, a tire rim having an annular locking means centrally thereof and a pneumatic tire comprising an annular cylindrical hollow casing having arcuate side walls terminating in flat rim abutting ends and an annular central wall projecting downwardly substantially centrally of said tread surface to below said side walls, dividing said hollow interior into two chambers each alone capable of supporting the vehicle, said center wall having a flexible upper portion and a substantially rigid lower portion, for at least half its lower length and having an annular cylindrical portion below said side walls spaced from the lower end thereof.

JOHN B. DES ROSIERS.

References Cited in the file of this patent

UNITED STATES PATENTS

| Number | Name | Date |
| --- | --- | --- |
| 1,404,532 | Lehr | Jan. 24, 1922 |
| 1,679,444 | Pagenhart | Aug. 7, 1928 |
| 2,045,860 | Knapp | June 30, 1936 |
| 2,078,015 | Perkins | Apr. 20, 1937 |

FOREIGN PATENTS

| Number | Country | Date |
| --- | --- | --- |
| 10,809 | Great Britain | 1897 |
| 820,459 | France | Aug. 2, 1937 |